Oct. 8, 1957     D. E. BRIGGS     2,809,055
TRACTOR HITCH
Filed July 15, 1954
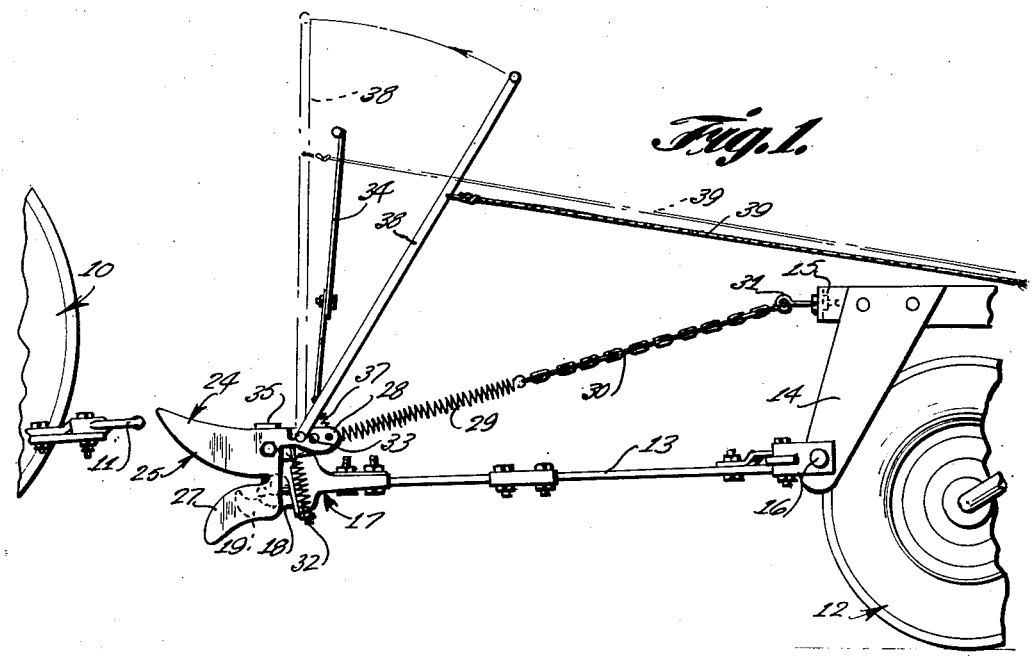
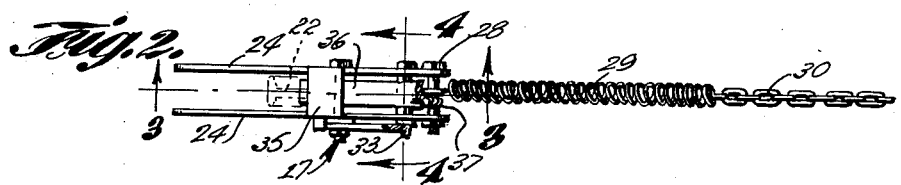
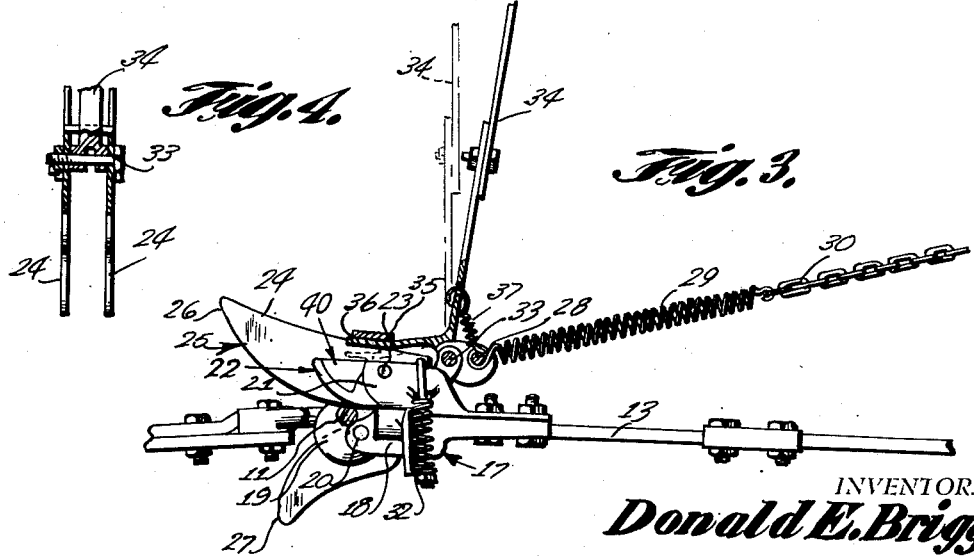
INVENTOR.
Donald E. Briggs
BY Victor J. Evans & Co.
ATTORNEYS

United States Patent Office 2,809,055
Patented Oct. 8, 1957

2,809,055

TRACTOR HITCH

Donald E. Briggs, Florence, S. Dak.

Application July 15, 1954, Serial No. 443,549

1 Claim. (Cl. 280—504)

This invention relates to a hitch, and more particularly to a hitch for connecting an agricultural implement such as a plow to a vehicle such as a tractor.

The object of the invention is to provide a hitch for detachably connecting two members or units together such as a tractor and a plow whereby the hitch will automatically release the plow being pulled or towed in the event that the plow encounters an obstacle.

Another object of the invention is to provide a hitch which is constructed so that the tractor lug or towing member will be guided into its proper position in the hitch even though the parts to be connected together may be of different elevations and wherein the various manually operable mechanisms for the implement or plow are within easy reach of the tractor operator.

A further object of the invention is to provide a hitch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the hitch attached to an implement such as a plow and showing the rear portion of a tractor with its tongue disengaged from the hitch.

Figure 2 is a top plan view of the hitch, with parts broken away and in section.

Figure 3 is a sectional view taken on the line 3—3 of Figure 2.

Figure 4 is a sectional view taken on the line 4—4 of Figure 2.

Referring in detail to the drawings, the numeral 10 designates a portion of a towing vehicle such as a tractor, Figure 1, and the tractor 10 may be equipped with a lug or ring member 11 which is adapted to be arranged in engagement with a hitch that is mounted on the front end of a mobile unit being towed or pulled and the unit 12 may be a plow mounted on wheels. A bracket 14 may be secured to the framework 15 of the plow 12, and a beam 13 is pivotally connected to the bracket 14 by means of a pin 16.

Secured to the front end of the beam 13 is a head 17 which includes a lower base part 18 that has a hook member 19 pivotally connected thereto by means of a pin 20. The head 17 further includes an upper base part 21, Figure 3, and a release trip member 40 is connected to the upper base part 21 by means of a pin 23. A cam 22 is adapted to coact with the lower hook member 19 for clamping therebetween the ring member 11 which is secured to the tractor 10.

Connected to the head 17 in any suitable manner, is a pair of similar plates 24, and each of the plates 24 is provided with a registering opposed cutout 25 which provides a guiding opening whereby the tractor 10 can be backed up so that the ring 11 will be guided by the opening 25 into the space between the cam 22 and the hook 19 so that the hook 19 will automatically move from the position shown in Figure 1 to the position shown in Figure 3 whereby the hitch will become automatically attached to the tractor 10. An off center spring arrangement 32 is provided for maintaining the cam 22 and hook 19 in the position shown in Figure 3 so that the ring member 11 can only be pulled out if sufficient pressure is exerted thereon, and the off center spring assembly 32 also serves to maintain the parts open as shown in Figure 1 until the ring member 11 is moved through the cutouts 25. The cutouts 25 define upper curved guiding surfaces 26 and lower curved guiding surfaces 27 in the plates 24, so that a flaring mouth is provided whereby the ring member 11 will move into its proper position even though the hitch and ring member 11 may be at slightly different elevations.

Extending between the rear ends of the plates 24 and secured thereto is a bolt and nut assembly 28, and a coil spring 29 has its front end connected to the bolt 28. A chain 30 connects the coil spring 29 to a hook member 31 which projects forwardly from the framework 15 of the plow 12.

A second bolt 33 is arranged forwardly of the first bolt 28, and the bolt 33 also extends between the pair of plates 24. A lever 34 has its lower end pivotally connected to the bolt 33, and extending forwardly from the lower end of the lever 34 is a foot or trigger 36 which is adapted to engage the release trip member 40 when the lever 34 is manually shifted, and the release trip member 40 causes actuation of the cam 22. Extending between the upper edges of the pair of plates 24 and secured thereto or formed integral therewith is a stop member 35 which limits clockwise pivotal movement of the lever 34.

Extending between the bolt 28 and the lever 34 is a coil spring 37 for a purpose to be later described. There is further provided an arm or lever 38 which has its lower end pivotally connected to the hitch, and a cable 39 extends rearwardly from the arm 38 to the vicinity of the plow 12 so that by manually shifting the arm 38 the cable 39 will cause actuation of the various plow units.

From the foregoing it is apparent that there has been provided a hitch which can be used for connecting two members together such as a tractor 10 and a plow 12. However the hitch can be used between a tractor and any other machine or vehicle which is equipped with a necessary head. The purpose of the present invention is to connect and disconnect the tractor from the plow or other equipment without the necessity of getting off the tractor and also the present invention eliminates the necessity of unfastening, replacing, splicing or knotting ropes when the plow or other equipment is disconnected from the tractor. The hook 19 lowers when disconnected and raises when closed and without the present invention, it would be necessary to strike a release trip above the hook 19 which cannot be done from the tractor seat. Also, without the present invention the plow is lowered into the ground or raised from the ground by means of a rope one end of which is attached to the tractor seat and the other end attached to the trip lever on the plow. If the tractor and plow are disconnected voluntarily, the rope is untied from the tractor seat and if the disconnection is forcible as when the plow strikes a stone, the rope is pulled from the seat or broken.

The present invention eliminates the necessity of having a rope extend from the tractor to the plow and instead provides two levers 34 and 38. The lever 38 is used for lowering and raising the plow, while the lever 34 is used for breaking the hitch and thereby disconnecting the tractor and plow or other piece of equipment. The two levers 34 and 38 are of different lengths to save or prevent confusion in their use and these levers are adjustable in height for different types of tractors. As shown in Figure 1 the tractor can be backed into the attachment and the lower end of the lever 34 is positioned between the pair of plates 24 and the trigger 36 on the lower end of the lever 34 is constructed so that when the lever 34 is pulled forward, the connection between the tractor and the connected equipment will be broken since the release trip 40 will be pushed down by the trigger 36. In other words, the release trip member 40 is engaged by the trigger 36 when the lever 34 is pulled manually from the solid line position of Figure 3 to the broken line position of Figure 3 and when the release trip 40 is moved down by this movement of the lever 34, the cam 22 will open up to leave a space as shown in Figure 1 so that the ring member 11 can be readily withdrawn from the hitch. The small spring 37 connected at the back of the lever 34 prevents the lever from accidentally tipping forward and the stop plate 35 across the plates 24 prevents the lever from tilting back and thus keeps the lever 34 upright so that it can always be reached from the tractor seat.

The other lever 38 may be pivotally connected to one of the plates 24 and the lever 38 may be provided with a suitable stop member to prevent or limit backward movement of this lever and the rope or cable 39 leads to the plow. The spring 29 and chain 30 can be adjusted to accommodate different types of plows and serves to hold the plow head 17 high enough so that the tractor drawbar 11 can slip into place to thus eliminate the necessity of manually raising the plow head to the required height.

The hitch serves as a guide for the ring member 11, and when the ring member 11 is backed into place, the hook member 19 is shoved back and locked. The release trip 40 can be manually pushed down to disconnect the tractor from the plow or other machine, and the numeral 36 designates the trigger on the lower end of the bar or the lever 34, and when the lever 34 is pulled forward, the member 19 will be pulled down to disconnect the tractor from the plow or other machine. To connect the tractor to the plow or other machine, it is only necessary to back the tractor up until the ring member 11 moves the hook member 19 back into its locked position.

The attachment of the present invention is connected to a conventional hitch similar to the one seen in Patent No. 2,737,400, and the attachment of the present invention includes the plates 24 which are connected to the hitch, and these plates are shaped or formed in such a manner so as to guide the ring member 11 into the hitch. The spring 29 and chain 30 maintain the parts in their proper elevated position, and the trigger 36 serves to actuate the release trip member 40. The lever 34 releases the tractor from the plow 12, and the lever 38 trips the plow 12 in and out of the ground, and these levers may be adjustable as desired. The spring 29 fastens onto the bolt 28 that goes through both plates behind the levers, and the chain 30 which is connected to the spring, extends to the frame of the plow and holds the plow drawbar and hitch at the proper height for the tractor drawbar.

I claim:

In combination, a ring member adapted to be connected to a towing vehicle, a hitch including a lower base part and an upper base part, a hook member pivotally connected to said lower base part for selectively clamping said ring member in said hitch, a release trip member pivotally connected to said hitch, plates connected to said hitch, and said plates being provided with cutouts which provide a guiding opening so that a flaring mouth is provided whereby the ring member will move into its proper position even though the hitch and ring member may be of slightly different elevations, a first securing element extending between the rear ends of said plates, a coil spring having its front end connected to said securing element, a chain extending rearwardly from said coil spring and connected to an implement being pulled, a second securing element arranged forwardly of said first securing element, a lever having its lower end pivotally connected to said second securing element, a trigger on the lower end of said lever adapted to engage the release trip member when the lever is shifted, an arm having its lower end pivotally connected to one of said plates, and a cable extending rearwardly from said arm to the implement being towed.

References Cited in the file of this patent

UNITED STATES PATENTS

| | | |
|---|---|---|
| 752,300 | Randolph | Feb. 16, 1904 |
| 788,692 | Ammann | May 2, 1905 |
| 790,221 | McCune | May 16, 1905 |